United States Patent
Li et al.

(10) Patent No.: US 12,242,535 B2
(45) Date of Patent: Mar. 4, 2025

(54) METHOD, SYSTEM FOR PROVIDING SIGHT INFORMATION AND COMPUTER-READABLE RECORDING MEDIUM

(71) Applicant: Framy Inc., Grand Cayman (KY)

(72) Inventors: Yu-Hsien Li, Taipei (TW); Wei-Shin Liu, New Taipei (TW)

(73) Assignee: Framy Inc., Grand Cayman (KY)

( * ) Notice: Subject to any disclaimer, the term of this patent is extended or adjusted under 35 U.S.C. 154(b) by 11 days.

(21) Appl. No.: 18/299,069

(22) Filed: Apr. 12, 2023

(65) Prior Publication Data
US 2023/0334091 A1    Oct. 19, 2023

(30) Foreign Application Priority Data
Apr. 18, 2022   (TW) .................. 111114571

(51) Int. Cl.
*G06F 16/00* (2019.01)
*G06F 16/732* (2019.01)
*G06F 16/735* (2019.01)
*G06F 16/787* (2019.01)

(52) U.S. Cl.
CPC ........ *G06F 16/7335* (2019.01); *G06F 16/735* (2019.01); *G06F 16/787* (2019.01)

(58) Field of Classification Search
CPC .. G06F 16/7335; G06F 16/735; G06F 16/787; G06F 16/29; G06F 3/0481; G06F 16/487; G06F 16/587; G06F 16/738; G06F 16/9535; G06F 16/9537; G06F 16/955; G06Q 50/10
See application file for complete search history.

(56) References Cited

U.S. PATENT DOCUMENTS

| | | | |
|---|---|---|---|
| 6,985,742 B1* | 1/2006 | Giniger | H04L 67/52 |
| | | | 455/414.3 |
| 7,707,208 B2* | 4/2010 | Jing | G06F 16/9537 |
| | | | 707/724 |
| 9,607,092 B2* | 3/2017 | Kreitler | G06F 16/904 |
| 11,361,043 B2* | 6/2022 | Bastide | G06F 16/9535 |

(Continued)

FOREIGN PATENT DOCUMENTS

| | | |
|---|---|---|
| EP | 3893181 A1 | 10/2021 |
| EP | 3941023 A1 | 1/2022 |

(Continued)

*Primary Examiner* — Debbie M Le
(74) *Attorney, Agent, or Firm* — Li & Cai Intellectual Property Office

(57) ABSTRACT

A method, a system for providing sight information, and a computer-readable recording medium are provided. The system provides a server having a content database and a sight-and-image database. A geographic range can be determined in a server when the server receives a location data from a user device. After querying the sight-and-image database according to the geographic range, one or more sights associated with at least one geographic location within the geographic range can be obtained. Afterwards, the content database is queried for obtaining one or more contents that are associated with the one or more sights. When query results are provided to the user device, the one or more sights are marked within the geographic range on a map interface.

10 Claims, 5 Drawing Sheets

(56) References Cited

U.S. PATENT DOCUMENTS

2009/0276118 A1* 11/2009 Shen ................ H04N 21/23614
                                                                          701/33.4
2017/0302714 A1* 10/2017 Ramsay ................ G06F 40/134
2022/0019635 A1    1/2022 Li et al.

FOREIGN PATENT DOCUMENTS

| TW | I582715 B | 5/2017 |
|----|-----------|--------|
| TW | 202209088 A | 3/2022 |

* cited by examiner

METHOD, SYSTEM FOR PROVIDING SIGHT INFORMATION AND COMPUTER-READABLE RECORDING MEDIUM

CROSS-REFERENCE TO RELATED PATENT APPLICATION

This application claims the benefit of priority to Taiwan Patent Application No. 111114571, filed on Apr. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system providing sight information, and more particularly to a method and a system for providing the sight information including sight-linking icons marked on a map and contents of sights, and a non-transitory computer-readable recording medium.

BACKGROUND OF THE DISCLOSURE

Currently, the Internet has become a major source from which a user can acquire information. Many search engines are provided on the Internet to allow the user to easily look up information by using keywords. For example, when the user searches for information of a specific sight, a conventional search engine provides a search result being obtained by queries based on the keywords relevant to the sight. The information relevant to the sight can be displayed in a list. The information can be texts, icons, and audiovisual contents corresponding to the sight that is searched.

A sight name can be information that connects to a geographic data. However, the conventional searching method fails to provide a proper map-based sight searching solution for the user.

SUMMARY OF THE DISCLOSURE

In response to the above-referenced technical inadequacies that the conventional search engine fails to provide good experience and a map-based searching service for users since the conventional search engine only relies on texts to provide a search result or uses an audiovisual page to provide audiovisual contents that correspond to texts correlated to a sight, the present disclosure provides a method and a system for providing sight information, and a non-transitory computer-readable recording medium.

In one aspect of the present disclosure, the system for providing sight information provides a server having a content database and a sight-and-image database and provides a software program executed in a user device. A graphical user interface is initiated by the software program.

In the method for providing sight information performed in the server, a location data is firstly obtained from the graphical user interface initiated by the user device, and a geographic range can be determined. Afterwards, according to coordinate information of the geographic range, the one or more sights and one or more corresponding sight-linking icons within the geographic range can be obtained by querying the sight-and-image database. Each of the sights is associated with a set of geographic coordinates. Next, according to location data of the one or more sights, the one or more contents correlated with each of the one or more sights can be obtained by querying the content database. Further, the one or more sight-linking icons and links between the contents and the sights are transmitted to the user device. The one or more sight-linking icons obtained according to the geographic coordinates of the sights are marked on the graphical user interface initiated by the user device.

Furthermore, after the server receives the location data from the user device, the location data is referred to for querying the content database so as to obtain one or more location-related contents within the geographic range, so that the one or more sight-linking icons and the one or more location-related content-linking icons are marked on the graphical user interface at the same time.

Furthermore, the one or more contents correlated with each of the sights can be an audiovisual content, a discussion topic, and/or a live video. When the user clicks on one of the sight-linking icons via the graphical user interface, the correlated audiovisual contents are automatically played, a discussion topic page is entered, or a live video is played. When one or more additional contents within a range that is expanded outward, with the geographic coordinates of the sight as a center, can be obtained by querying the content database, the one or more additional contents are sorted by popularity, and the sight-linking icon correlated with the sight links with the content and the one or more additional contents.

Moreover, when querying the content database, a personal preference can be a filter that is used to obtain the one or more sight-related contents that match with the personal preference within the geographic range.

In one further aspect of the present disclosure, a non-transitory computer-readable recording medium is provided for storing computer instructions that are configured to be executed in the user device. When the computer instructions are executed, the user device connects with the server of the system for providing sight information, loads contents from the server, and initiates the graphical user interface. The user device then performs the method for providing sight information, including playing the contents correlated with the sights.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
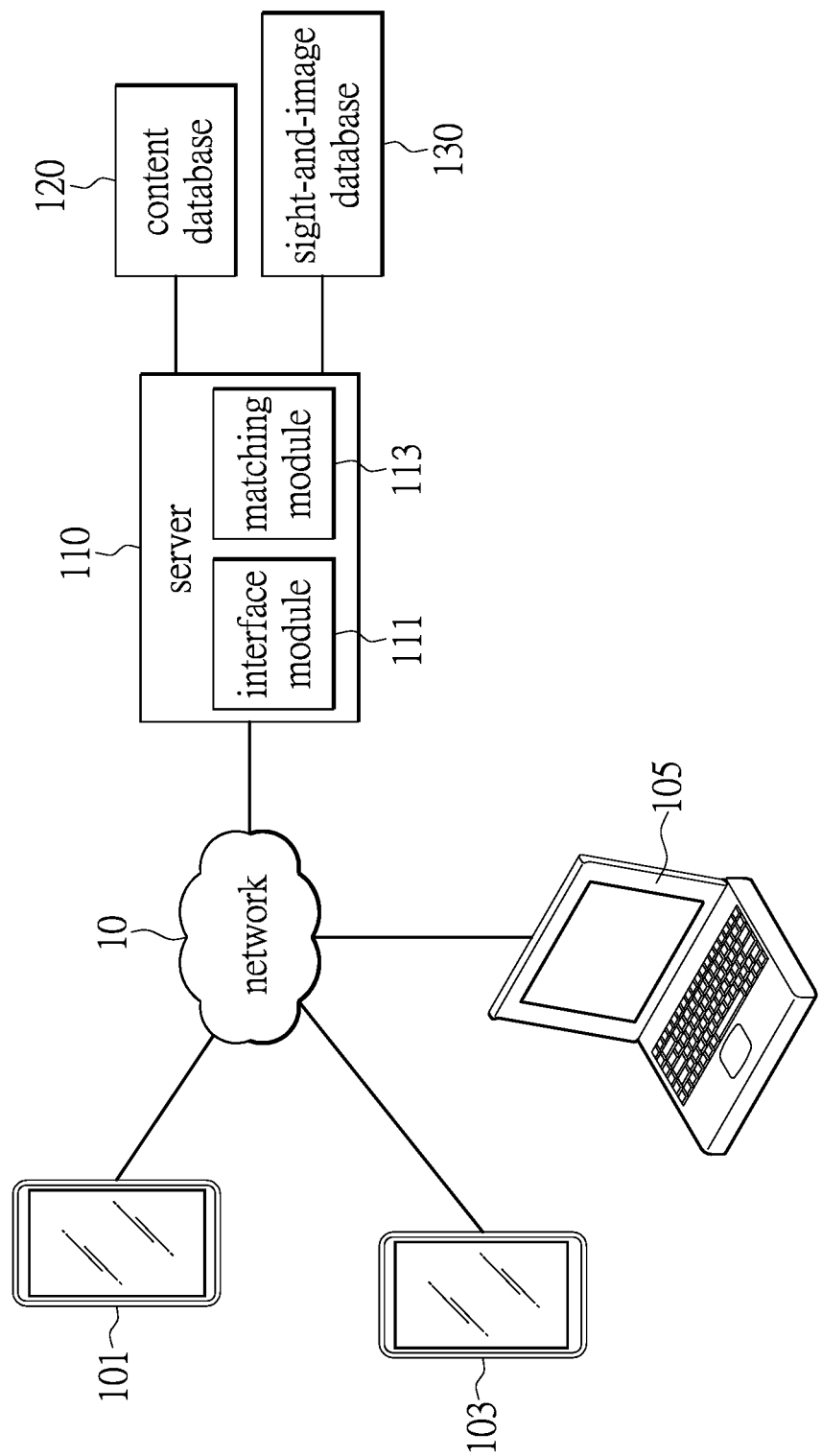
FIG. 1 is a schematic diagram depicting a framework of a system for providing sight information according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure provides a method and a system for providing sight information, and a non-transitory computer-readable recording medium. The system allows a user to acquire locations of sights via a graphical user interface (GUI), and quickly obtain contents correlating to the sights. Further, the system also provides a user-end software program that achieves a software means for implementing the graphical user interface to browse the sights and the contents correlating to the sights. Therefore, the user can use a user device such as a mobile phone, a tablet computer, or a personal computer to easily browse sight-linking icons marked on the graphical user interface. The sight-linking icons are provided for the user to click for viewing the contents correlated to the sights, especially the contents having high popularity. For example, via the graphical user interface, the user can view a plurality of sight-related audiovisual contents that can be played automatically, enter a discussion topic page, or play a live video.

Preferably, the user device uses the graphical user interface to display a map interface, on which the sight-linking icons correlated with different geographic locations are marked. Each of the sight-linking icons is linked to the content correlated to the sight. When the location or the range that is browsed is changed, the sights within the geographic range and the sight-linking icons marked on the map interface are also synchronously refreshed.

According to one embodiment of the present disclosure, the system for providing sight information is provided. Reference is made to FIG. 1, which is a schematic diagram depicting a framework of the system. The system is operated via a server 110 that is used to provide a plurality of location-related sight information such as the sight-linking icons marked on the graphical user interface for providing one or more contents correlated with each of the sights.

The main functions of the server 110 include providing an interface module 111 in user devices 101, 103, and 105 for showing the contents. The interface module 111 allows each of the user devices 101, 103, and 105 to initiate a user interface via a webpage or a specific software program for showing the sight-linking icons and the location-related contents. Furthermore, a matching module 113 is provided in the server 110. The matching module 113 is used to match the contents in a database according to location data transmitted from the user devices. The contents in the database are such as the sight-linking icons and the correlated contents. Further, the matching module 113 can match the contents in the database according to personal preferences of the users for obtaining the contents that the users are interested in.

According to one embodiment of the present disclosure, the server 110 uses a database technology to implement a content database 120 and a sight-and-image database 130. The content database 120 records the contents that are linked with geographic coordinates and the contents can also match with the coordinates of sights. The sight-and-image database 130 records location coordinates of the sights and the corresponding sight icons. In one embodiment of the present disclosure, when the server 110 receives location data from any of the user devices 101, 103, and 105 via a network 10, a software sequence running in the server 110 can query the sight-and-image database 130 according to the location data so as to obtain one or more sights and one or more sight-linking icons that correspond to the one or more sights within a geographic range. The one or more sight-linking icons are transmitted to the user devices 101, 103, and 105, and can be marked on the graphical user interface initiated by any of the user devices 101, 103, and 105. Particularly, each of the sight-linking icons is configured to represent information of the corresponding sight and link to the correlated content. The system accordingly allows the users to easily browse the sights, the correlated contents, and the nearby contents having high popularity.

On the other hand, in addition to providing the sight information, the server 110 can query the content database 120 to obtain one or more location-related contents within the geographic range according to the location data when the server 110 receives the location data from the user devices 101, 103, and 105. Similarly, the one or more corresponding location-related content-linking icons can be provided to the user devices 101, 103 and 105. The user interface initiated by the software program executed in any of the user devices 101, 103, and 105 can be a map-based graphical user interface that is able to simultaneously mark the one or more sight-linking icons and one or more location-related content-linking icons. The system implements a content provider that provides the sight information and the location-related contents. The system allows the users to arbitrarily adjust the geographic range to view various contents via the user interface, and the server 110 can instantly return the sight-linking icons and the content-linking icons to be marked on the user interface.

A specific software sequence operated in the server 110 records user activities (e.g., replying to a specific discussion topic, likes, follows, and shares) through algorithms and calculates areas (e.g., a city, a country, a sight, and a landmark) of interest and contents of interest of the user. The software sequence can further group the users so as to effectively recommend the sights and contents that match with areas of interest of each of the users. Furthermore, based on the activity data (e.g., replying, liking, following, and sharing various contents) for the various contents of each of the users and time of the contents, the popularity of the area to which the contents belong can be calculated.

Figure 2:
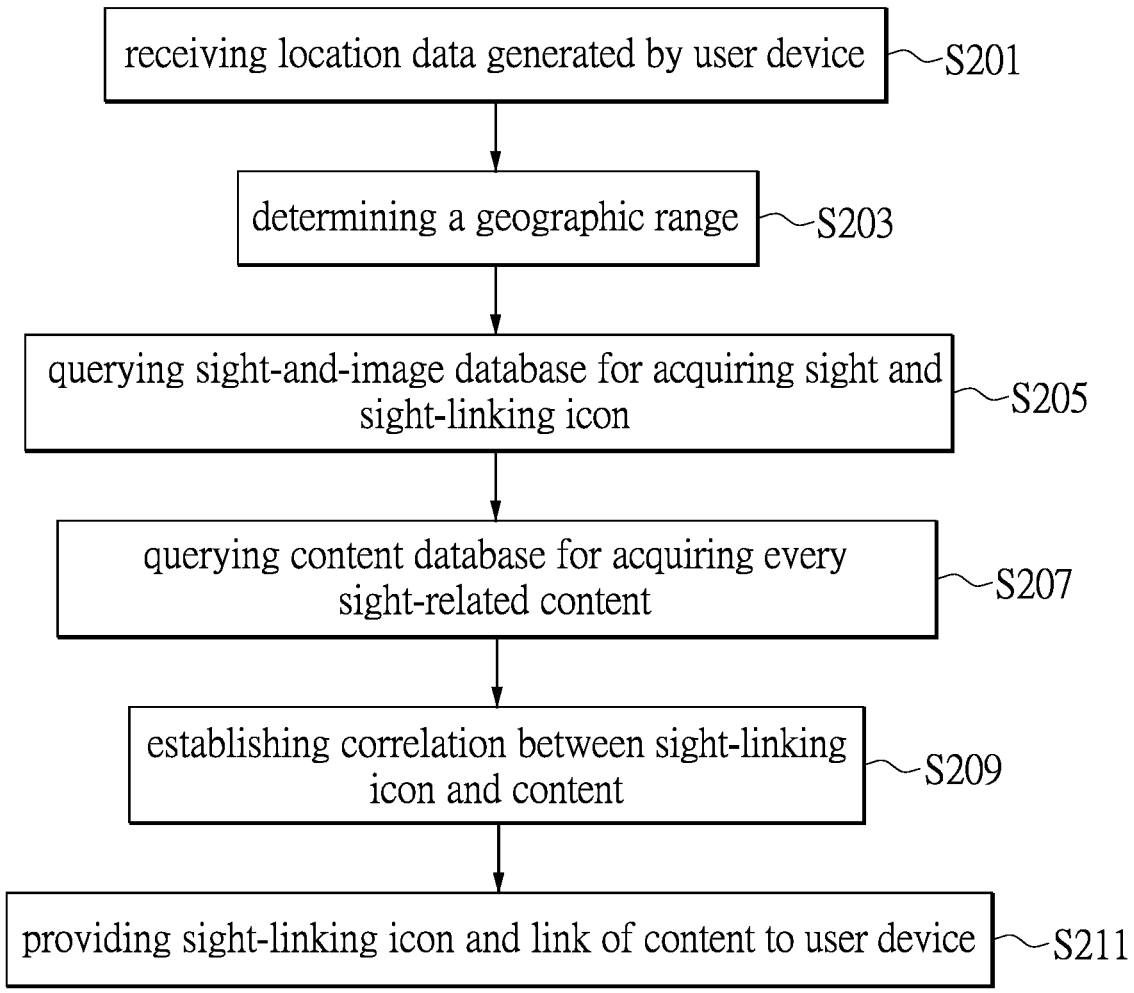
FIG. 2 is a flowchart illustrating a method for providing sight information according to one embodiment of the present disclosure.

Reference is then made to FIG. 2, which is a flowchart illustrating the method for providing sight information according to one embodiment of the present disclosure. Before performing the method, the user device executes the software program, and the software program can preferably be a map-based social media program that is stored in a non-transitory computer-readable recording medium of the user device. The non-transitory computer-readable recording medium stores computer instructions that are executed to connect with the server of the system for providing sight information, load the contents from the server, and initiate the graphical user interface. It should be noted that the graphical user interface can be a map interface initiated in the user device, and the contents can be audiovisual contents, discussion topics, and/or live videos. When the computer instructions are executed in the user device, the one or more sight-linking icons are marked on the map interface, a video playback page is used to play the sight-related audiovisual content, a sight-related discussion topic page is entered, or a live video is played.

FIG. 2 is a flowchart illustrating the method for providing sight information according to one embodiment of the present disclosure.

When the user device executes the software program provided by the system, the user device connects with the server of the system that provides the sight information and initiates a graphical user interface that is used to browse a map. A location data is generated when the software program is used to browse the map. For example, the location data can be the coordinates of a central location of the graphical user interface displayed on the user device. The location data is then transmitted to the server (step S201), and the server then determines a geographic range according to the received location data and display condition (e.g., screen size and resolution) of the user device (step S203).

Next, according to the coordinate information of the geographic range, the server queries a sight-and-image database so as to obtain one or more sights within the geographic range and one or more sight-linking icons corresponding to the one or more sights. Each of the sights is associated with a set of geographic coordinates (step S205). In the meantime, the server queries a content database according to the location data of the one or more sights so as to obtain one or more contents correlated to each of the sights (step S207). In addition to the sight-related contents, more location-related contents within the geographic range can be obtained when the server queries the content database according to the geographic range.

Therefore, in the server, a link between each of the sight-linking icons and a corresponding content can be established (step S209), and the one or more sight-linking icons and the links of the contents are transmitted to the user device (step S211). The one or more sight-linking icons can be marked on the graphical user interface according to the geographic coordinates of the sights. Furthermore, when the one or more location-related content-linking icons are received from the server, the one or more sight-linking icons and the one or more location-related content-linking icons can be simultaneously marked on the graphical user interface initiated by the user device.

It should be noted that the one or more contents correlated with each of the sights are such as a correlated audiovisual content, a discussion topic, and/or a live video. The audiovisual content can be set by the system as a main content that is correlated with each of the sights, and the main content can also be the discussion topic or the live video. When the user clicks on the sight-linking icon marked on a graphical user interface, the correlated content will be automatically played. Furthermore, each of the sights is associated with a set of geographic coordinates, the system can properly arrange a geographic range to be associated with each of the sights, and the geographic range can be a range that expands outward with the geographic coordinates of the sight as a center. Therefore, one or more additional contents within the expanded range can be obtained when querying the content database, and can then be sorted by popularity. In addition to linking the original contents, the sight-linking icons corresponding to the sight also links the additional contents sorted by popularity. Therefore, through the above arrangement, the user can browse a variety of popular contents share by other users.

In one further embodiment of the present disclosure, the system can learn the personal preference of each of the users from internal or external activity data of the user collected by the system, so that when the content database is queried by the system, the personal preference can be a filter that is used to obtain the one or more sight-related contents that matches with the personal preference within the geographic range.

Figure 3:
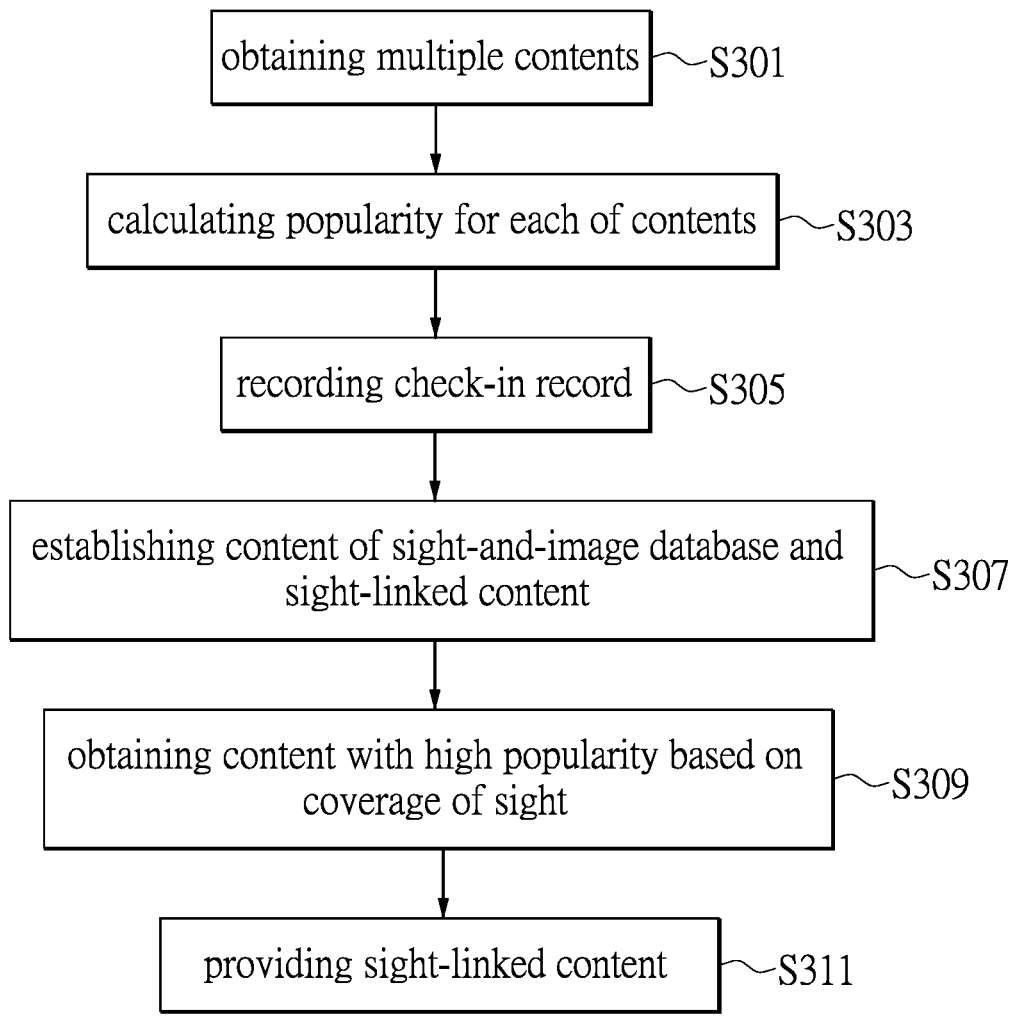
FIG. 3 is a flowchart illustrating a process of establishing sights and contents correlated with sights in the method for providing sight information according to one embodiment of the present disclosure.

In addition to being the database established by the maintenance personnel of the system, the sight-and-image database of the system of the present disclosure can be used to obtain the sight information based on various data. Reference is made to FIG. 3, which is a flowchart illustrating a process of establishing the sights and the contents correlated with sights in the method for providing sight information according to one embodiment of the present disclosure.

In the present embodiment, when the server receives the contents uploaded by multiple users (step S301), the system calculates a popularity of each of the contents, and each of the contents corresponds to a set of geographic coordinates (step S303). In an exemplary example, the popularity of each of the contents can be calculated based on activity data (e.g., likes, shares, and browsing rate) of the users for a period of time, and the popularity can be one of the references for evaluating each of the contents. On the other hand, the server also records check-in records made by the users at various geographic locations (step S305). By comparing the popularities, geographic locations, and the check-in records of the contents within the geographic range, the sights within the geographic range can be determined and the correlations between the sights and the contents can be established (step S307). Furthermore, a representative content correlated to each of the sights can also be set. For example, a representative content for the sight can be an audiovisual content, a discussion topic, or a live video. These data forms the records in the sight-and-image database.

Afterwards, when the server determines that the user is browsing a specific geographic range, the sights, the sight-linking icons, and the contents having high popularity within the geographic range can be obtained by querying the sight-and-image database (step S309). Finally, the sight and linked content of the sight are provided to the user device (step S311).

Therefore, through the system for providing sight information, the software method operated in the server determines the sight locations according to the check-in records at the geographic locations, and calculates the popularity according to the activity data of the user. After integrating the check-in records and the contents having high popularity, the server allows the user to view the popular contents correlated with the sights when the user clicks on one of the sight-linking icons. Furthermore, the contents provided to the user can also match with the personal preference of the user. Therefore, the method ensures that the users can obtain valid contents correlated with the sights without obtaining the contents that the users are not interested in or the contents that are not related to any of the sights.

Figure 4:
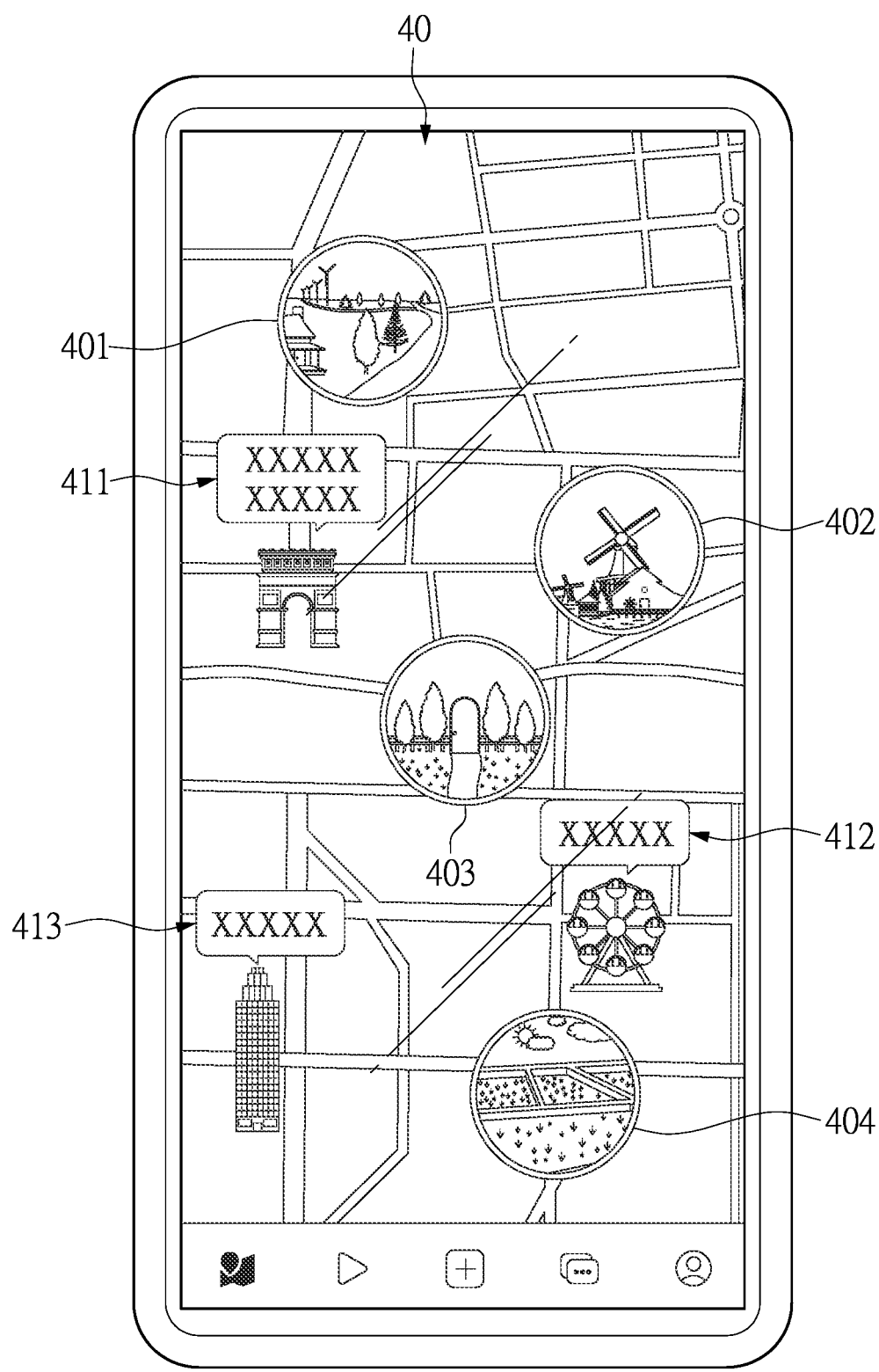
FIG. 4 is a schematic diagram illustrating a graphical user interface provided in the method for providing sight information according to one embodiment of the present disclosure.

Reference is made to FIG. 4, which is a schematic diagram that illustrates a graphical user interface provided by the user device. An electronic map 40 is shown in the figure. Various location-related content-linking icons 401, 402, 403, and 404 and the sight-linking icons 411, 412, and 413 obtained by the above method can be marked on the electronic map 40. This embodiment shows that multiple sights are included in the geographic range browsed by the user, and the sight-linking icons 411, 412, and 413 exemplarily indicate the landmarks such as a Ferris wheel, a skyscraper, and the Arc de Triomphe.

Figure 5:
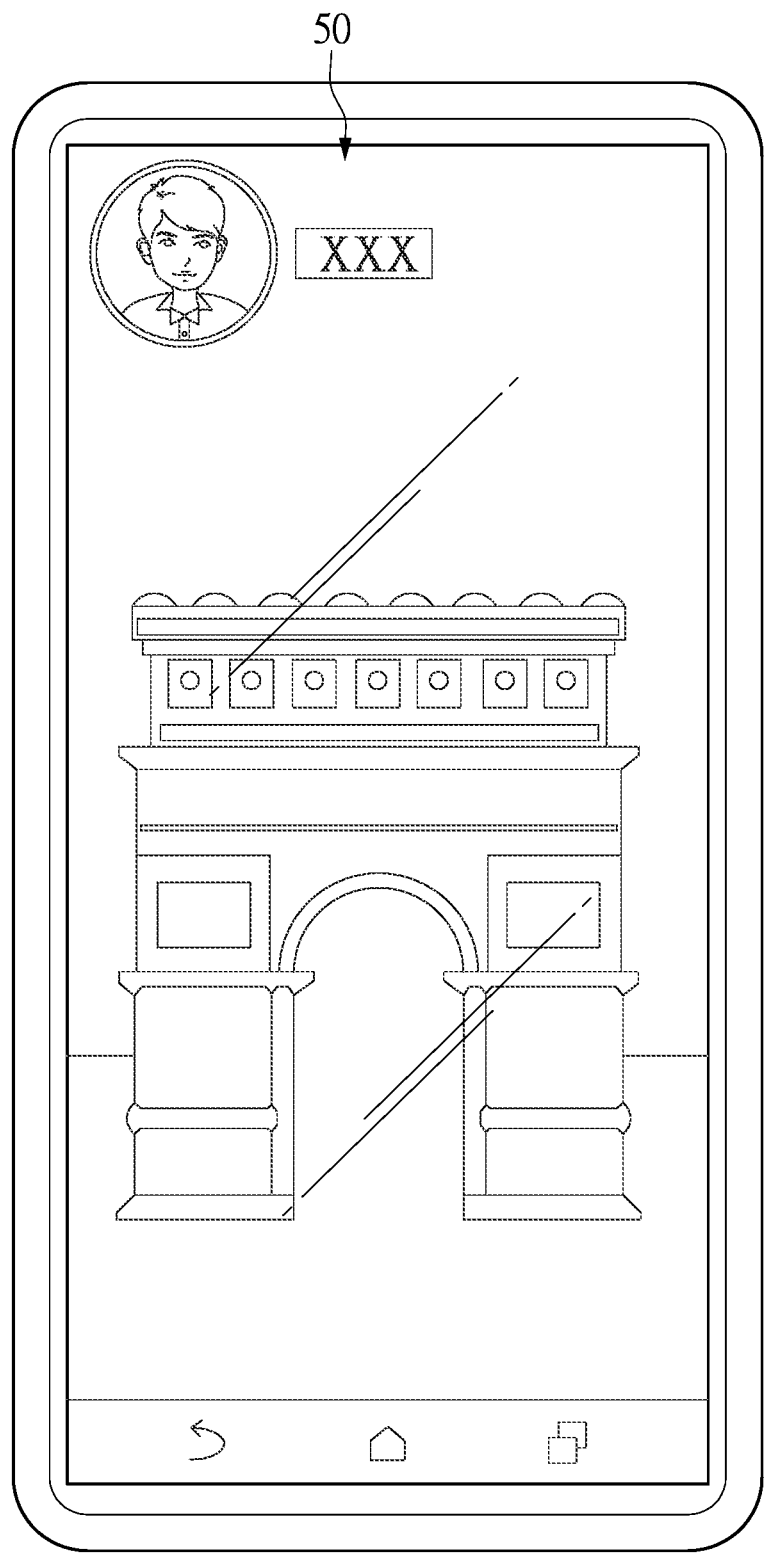
FIG. 5 is a schematic diagram depicting a video playback page used in the method for providing sight information according to one embodiment of the present disclosure.

According to one further embodiment of the present disclosure, after an application set is executed in the user device, a video playback page is provided for playing the audiovisual content, or a discussion topic page is entered, or a live video is played. Reference is made to FIG. 5, and FIG. 5 is a schematic diagram showing the video playback page. When the user clicks on one of the sights shown on the graphical user interface, the video playback page 50 as shown on FIG. 5 is used to play an audiovisual content correlated with the sight. When one or more additional audiovisual contents are determined to be correlated with the sight, the one or more additional audiovisual contents can be played in an order of popularity.

In conclusion, according to the embodiments relating to the method for providing sight information, the system, and the non-transitory computer-readable recording medium, the system provides the content database and the sight-and-image database, and the system can obtain the sight information within the geographic range to be browsed by the user. Furthermore, the corresponding sight-linking icons can be marked on the map interface initiated in the user device for the user to easily obtain and review the sight information.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for providing sight information, adapted to a server, comprising:
   in the server, querying a sight-and-image database according to coordinate information of a geographic range generated by a graphical user interface so as to obtain one or more sights and one or more corresponding sight-linking icons within the geographic range, wherein each of the sights is associated with geographic coordinates;
   querying a content database according to location data of the one or more sights so as to obtain one or more contents correlated with each of the one or more sights, and one or more additional contents within a range that is expanded outward from geographic coordinates of the sight which acts as a center; and
   transmitting the one or more sight-linking icons and links between each of the sights and the one or more contents correlated with the one or more sights to a user device so as to mark the one or more sight-linking icons on the graphical user interface based on the geographic coordinates associated with each of the sights;
   wherein the one or more additional contents are sorted by popularity, and one of the sight-linking icon correlated with the sight links with the one or more content and the one or more additional contents in an order of popularity; and, when one of the one or more sight-linking icons on the graphical user interface is clicked, a video playback page is used to play the content, and the one or more additional contents are played in the order of popularity.

2. The method according to claim 1, wherein the one or more contents correlated with each of the sights is an audiovisual content, a discussion topic, and/or a live video.

3. The method according to claim 1, wherein, when querying the content database, a personal preference is used as a filter to obtain the one or more contents that correlate with the sight and match with the personal preference within the geographic range.

4. A system for providing sight information, comprising:
   a server having a content database and a sight-and-image database;
   wherein the server performs a method for providing sight information, and a software program being executed in a user device that connects with the server via a network for initiating a graphical user interface displayed on the user device, and the method includes:
      determining a geographic range according to location data generated by the graphical user interface initiated by the user device;
      querying the sight-and-image database according to coordinate information of the geographic range generated by the graphical user interface so as to obtain one or more sights and one or more corresponding sight-linking icons within the geographic range, wherein each of the sights is associated with a set of geographic coordinates;
      querying the content database according to location data of the one or more sights so as to obtain one or more contents correlated with each of the one or more sights, and one or more additional contents within a range that is expanded outward from geographic coordinates of the sight which acts as a center; and transmitting the one or more sight-linking icons and links between each of the sights and the one or more contents correlated with the one or more sights to the user device so as to mark the one or more sight-linking icons on the graphical user interface based on the geographic coordinates of each of the sights;

wherein the one or more additional contents are sorted by popularity, and one of the sight-linking icon correlated with the sight links with the one or more content and the one or more additional contents in an order of popularity; and, when one of the one or more sight-linking icons on the graphical user interface is clicked, a video playback page is used to play the content, and the one or more additional contents are played in the order of popularity.

5. The system according to claim 4, wherein, after the server receives the location data from the user device, the location data is referred to for querying the content database so as to obtain one or more location-related contents within the geographic range and provide one or more corresponding location-related content-linking icons to the user device, so that the one or more sight-linking icons and the one or more location-related content-linking icons are marked on the graphical user interface at the same time.

6. The system according to claim 4, wherein, when querying the content database, a personal preference is used as a filter to obtain the one or more contents that correlate with the sight and match with the personal preference within the geographic range.

7. A non-transitory computer-readable recording medium, which stores computer instructions executed to connect with a server of a system for providing sight information, load contents from the server, and initiate a graphical user interface, wherein the computer instructions are executed in a user device so that the following steps are performed:

when the user device initiates the graphical user interface, generating and transmitting a location data to the server, and the server determining a geographic range according to the location data; and receiving the geographic range and one or more sight-linking icons correlated with one or more sights within the geographic range from the server, so that the one or more sight-linking icons are marked on the graphical user interface according to geographic coordinates of each of the sights;

wherein, in the server, one or more sights and one or more corresponding sight-linking icons within the geographic range are obtained by querying a sight-and-image database according to coordinate information of the geographic range, and one or more contents correlated with each of the one or more sights, and one or more additional contents within a range that is expanded outward from geographic coordinates of the sight which acts as a center are obtained by querying a content database according to the location data of the one or more sights;

wherein the one or more additional contents are sorted by popularity, and one of the sight-linking icon correlated with the sight links with the one or more content and the one or more additional contents in an order of popularity; and, when one of the one or more sight-linking icons on the graphical user interface is clicked, a video playback page is used to play the content, and the one or more additional contents are played in the order of popularity.

8. The non-transitory computer-readable recording medium according to claim 7, wherein the graphical user interface is a map interface initiated in the user device; wherein, when the computer instructions are executed in the user device, the one or more sight-linking icons are marked on the map interface.

9. The non-transitory computer-readable recording medium according to claim 7, wherein the one or more contents correlated with each of the sights is an audiovisual content, a discussion topic, and/or a live video.

10. The non-transitory computer-readable recording medium according to claim 9, wherein, when one of the one or more sight-linking icons on the graphical user interface is clicked, a video playback page is used to play the content, and the one or more additional contents are played in the order of popularity.

* * * * *